United States Patent
Ren et al.

(10) Patent No.: US 8,498,965 B1
(45) Date of Patent: Jul. 30, 2013

(54) METHODS AND APPARATUS FOR GENERATING DIFFERENCE FILES

(75) Inventors: Liwei Ren, Sunnyvale, CA (US); Gen Chen, Jiangsu (CN); Vivian Wang, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 399 days.

(21) Appl. No.: 12/710,060

(22) Filed: Feb. 22, 2010

(51) Int. Cl.
*G06F 17/00* (2006.01)

(52) U.S. Cl.
USPC ............................ 707/625; 707/638; 717/169

(58) Field of Classification Search
USPC ................... 707/625, 758, 695, 638; 711/216
See application file for complete search history.

(56) References Cited

U.S. PATENT DOCUMENTS

| | | | |
|---|---|---|---|
| 5,832,520 A | | 11/1998 | Miller |
| 6,233,589 B1 * | | 5/2001 | Balcha et al. ................. 707/625 |
| 6,535,894 B1 | | 3/2003 | Schmidt et al. |
| 7,089,270 B2 * | | 8/2006 | Ren et al. ...................... 707/695 |
| 7,661,102 B2 * | | 2/2010 | Ogle .............................. 717/168 |
| 2001/0020272 A1 * | | 9/2001 | Le Pennec et al. ........... 713/200 |
| 2001/0039497 A1 * | | 11/2001 | Hubbard .......................... 705/1 |
| 2002/0073330 A1 * | | 6/2002 | Chandnani et al. ........... 713/200 |
| 2002/0147849 A1 * | | 10/2002 | Wong et al. .................... 709/246 |
| 2005/0254521 A1 * | | 11/2005 | Peng .............................. 370/472 |
| 2007/0038681 A1 * | | 2/2007 | Pierce et al. .................. 707/201 |
| 2007/0288533 A1 * | | 12/2007 | Srivastava et al. ............ 707/203 |
| 2008/0159331 A1 * | | 7/2008 | Mace et al. .................... 370/473 |
| 2008/0177799 A1 * | | 7/2008 | Wilson .......................... 707/200 |
| 2010/0191752 A1 * | | 7/2010 | Lauther ......................... 707/758 |
| 2010/0217953 A1 * | | 8/2010 | Beaman et al. ............... 711/216 |
| 2011/0055155 A1 * | | 3/2011 | Page et al. ..................... 707/625 |

* cited by examiner

*Primary Examiner* — Albert Phillips, III
(74) *Attorney, Agent, or Firm* — Okamoto & Benedicto LLP

(57) ABSTRACT

One embodiment relates to a computer-implemented method for generating difference data between reference and target files. A difference engine implemented using a computer receives the reference and target files. The difference engine performs a first procedure to generate difference data representing the difference between the reference and target files if the size of the reference file is less than a first threshold size. The difference engine performs a second procedure to generate the difference data if the size of the reference file is less than a second threshold size and greater than the first threshold. The difference engine performing a third procedure to generate difference data if the size of the reference file is greater than the second threshold size. Other embodiments relate to apparatus for generating difference data between reference and target files and for reconstructing the target files from the reference files using the difference data.

24 Claims, 5 Drawing Sheets

METHODS AND APPARATUS FOR GENERATING DIFFERENCE FILES

BACKGROUND OF THE INVENTION

1. Field of the Invention

The present invention relates generally to methods and apparatus for differential compression for incremental file updates and other applications.

2. Description of the Background Art

A problem in the field of computing is the need to update computer files on various disparate computers. The updating may be done, for example, by downloading a complete new version of the file or by an incremental update in which modifying data (i.e., the difference) for modifying the existing file to form the updated version is downloaded. For example, a software update may be required because the program has altered in response to the occurrence of bugs within the program or to add additional functionality to a program.

In another example, frequent computer file updates may be needed when the computer file represents rapidly evolving data needed by the computer. For instance, anti-virus computer programs generally utilize computer virus definition (signature) data which needs to be updated frequently to provide protection against new viruses. In addition, data leakage prevention programs use document fingerprints which also need to be updated.

It is highly desirable to improve techniques which facilitate differential compression for incremental file updates and other applications.

SUMMARY

One embodiment relates to a computer-implemented method for generating difference data between reference and target files. A difference engine implemented using a computer receives the reference file and the target file. The difference engine determines a size of the reference file. The difference engine performs a first procedure to generate difference data representing the difference between the reference and target files if the size of the reference file is less than a first threshold size. The difference engine performs a second procedure to generate the difference data if the size of the reference file is less than a second threshold size and greater than the first threshold. The difference engine performs a third procedure to generate the difference data if the size of the reference file is greater than the second threshold size.

Another embodiment relates to a computer apparatus configured to generate difference data between reference and target files. The apparatus includes data storage configured to store computer-readable instruction code and data, and a processor configured to access the data storage and to execute said computer-readable instruction code. A difference engine is implemented on the computer apparatus. The difference engine comprises computer-readable instruction code configured to determine a size of the reference file, perform a first procedure to generate difference data representing the difference between the reference and target files if the size of the reference file is less than a first threshold size, perform a second procedure to generate the difference data if the size of the reference file is less than a second threshold size and greater than the first threshold, and perform a third procedure to generate the difference data if the size of the reference file is greater than the second threshold size.

These and other features of the present invention will be readily apparent to persons of ordinary skill in the art upon reading the entirety of this disclosure, which includes the accompanying drawings and claims.

DETAILED DESCRIPTION

Example Computer

Figure 1:
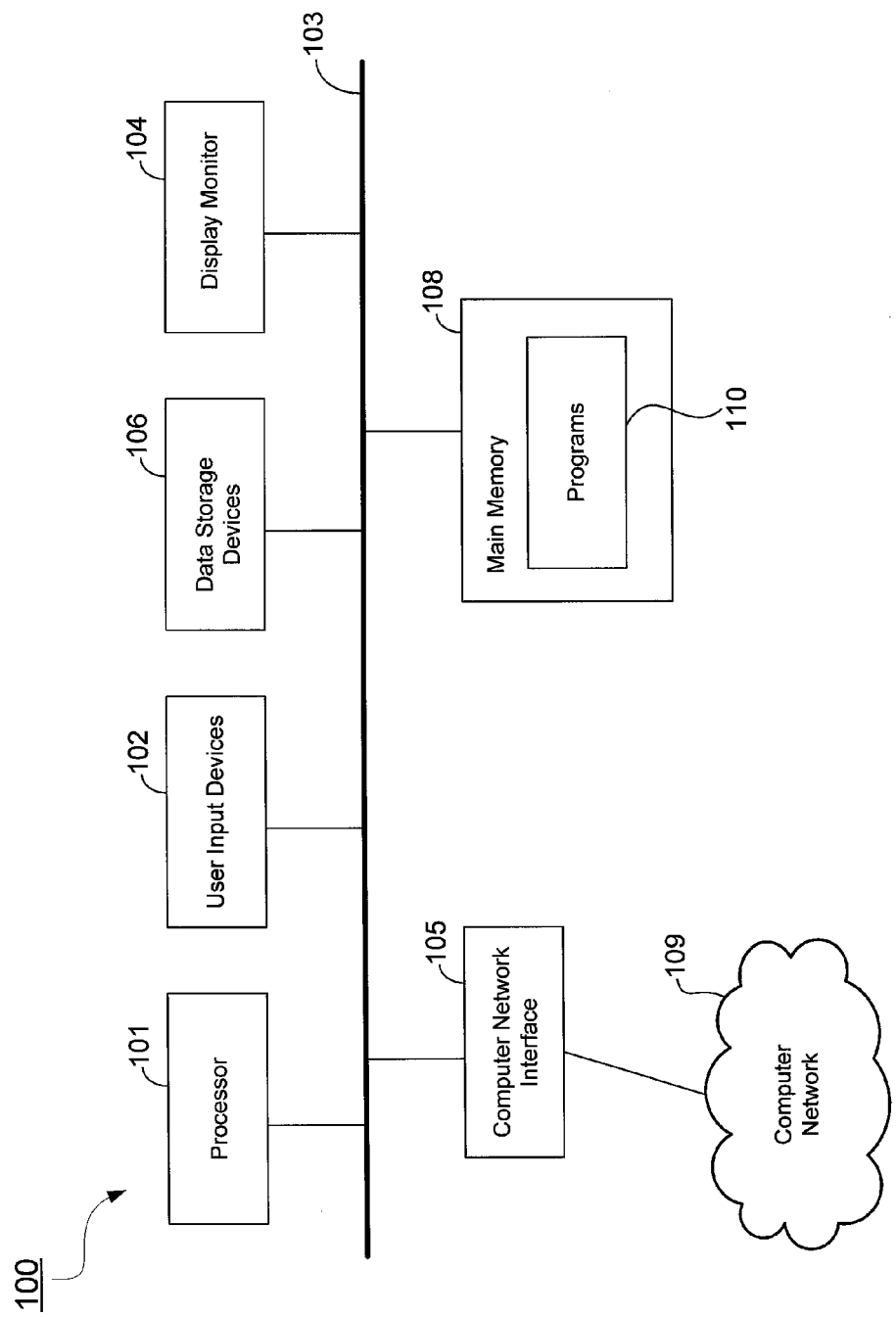
FIG. 1 is a schematic diagram of an example computer that may be used in embodiments of the present invention.

Referring to FIG. 1, there is shown a schematic diagram of an example computer that may be used in embodiments of the present invention. The computer shown in the example of FIG. 1 may be employed as a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse, etc.), a display monitor 104 (e.g., LCD, cathode ray tube, flat panel display, etc.), a computer network or communications interface 105 (e.g., network adapters, wireless network adapters, etc.) for communicating over a computer (data) network 109, one or more data storage devices 106 (e.g., hard disk drive, optical drive, FLASH memory, etc.) for storing computer-readable data onto computer-readable media and for reading the data therefrom, and a main memory 108 (e.g., DRAM, SRAM, etc.).

Computer-readable data (including computer-readable program instructions) may be stored in the data storage devices 106 and may be loaded into main memory 108. Computer-readable data may also be received over the computer network 109 by way of a communications interface 105. In particular, the main memory 108 may loaded with programs 110 (comprising computer-readable instruction code and data) which may be executed by the processor 101 to perform some of the functionalities and operations as described herein.

Difference and Merge Engines

Figure 5:
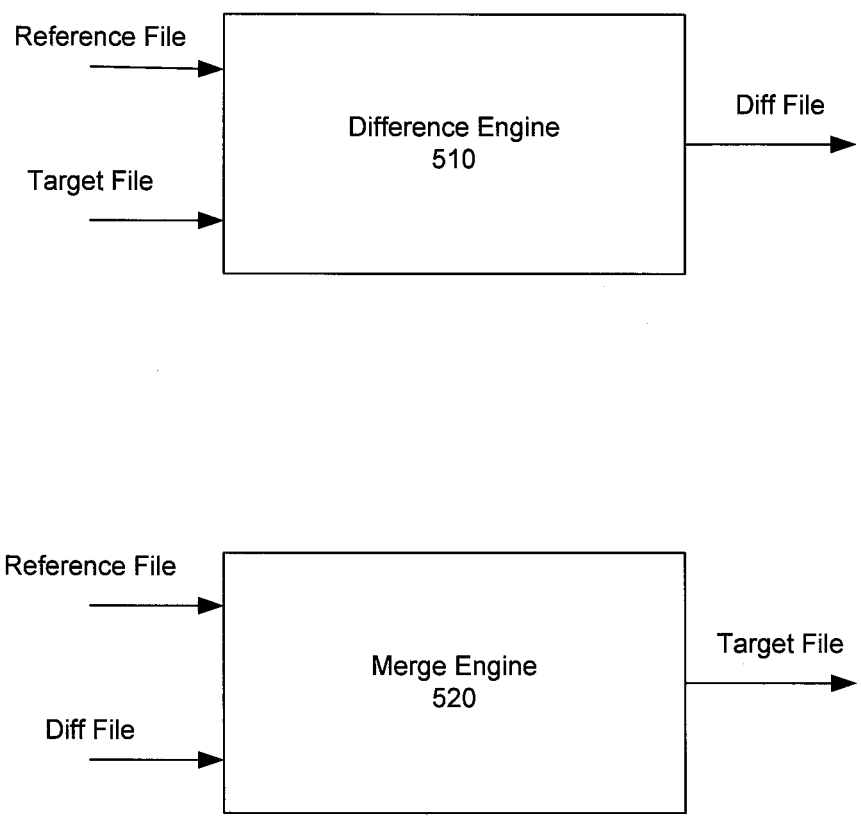
FIG. 5 is a schematic diagram illustrating the inputs and outputs of a difference engine and a merge engine in accordance with an embodiment of the invention.

FIG. 5 is a schematic diagram illustrating the inputs and outputs of a difference engine 510 and a merge engine 520 in accordance with an embodiment of the invention. The difference engine 510 is configured to receive a reference file and a target file. The difference engine 510 processes these files to generate a difference (diff) file. The diff file includes information sufficient for the merge engine to re-generate the target file from the reference file. The merge engine 520 is configured to receive the reference file and the diff file. The merge engine 520 processes these files to re-generate the target file.

Efficient Difference Engine

One problem with conventional difference engines is that, while they may have good compression rates, they typically have difficulty handling files of large sizes. This is primarily due to fact that the memory requirements of the conventional procedures or algorithms grows rapidly with increasing file size. For example, applicants estimate that a conventional difference engine implemented on a 32-bit computer with 512 MB (megabytes) memory may reasonably handle file sizes of less than 64 MB due to memory limitations. Conventional difference engines are particularly inefficient in handling well-structured files of extremely large file sizes (for example, of a scale of more than several GB).

One conventional difference engine referred to as "xdelta" utilizes an algorithm which can handle relatively large file sizes, such as a 1 GB file. However, the xdelta difference engine has a rather poor compression rate which results in a larger size of the resultant difference data. The xdelta difference engine is also inefficient in handling well-structured files of extremely large file sizes.

In general, difference (diff) technology includes a difference engine and a merge engine. The difference engine generates the difference between two files. These two files are referred as a reference file R and a target file T, respectively. The difference generated may be referred to as a diff file (or delta file) which may be presented as $\delta = T - R$. The merge engine merges the reference file with the diff file to reconstruct the target file. In this case, the target file may be presented as $T = R + \delta$.

Figure 2:
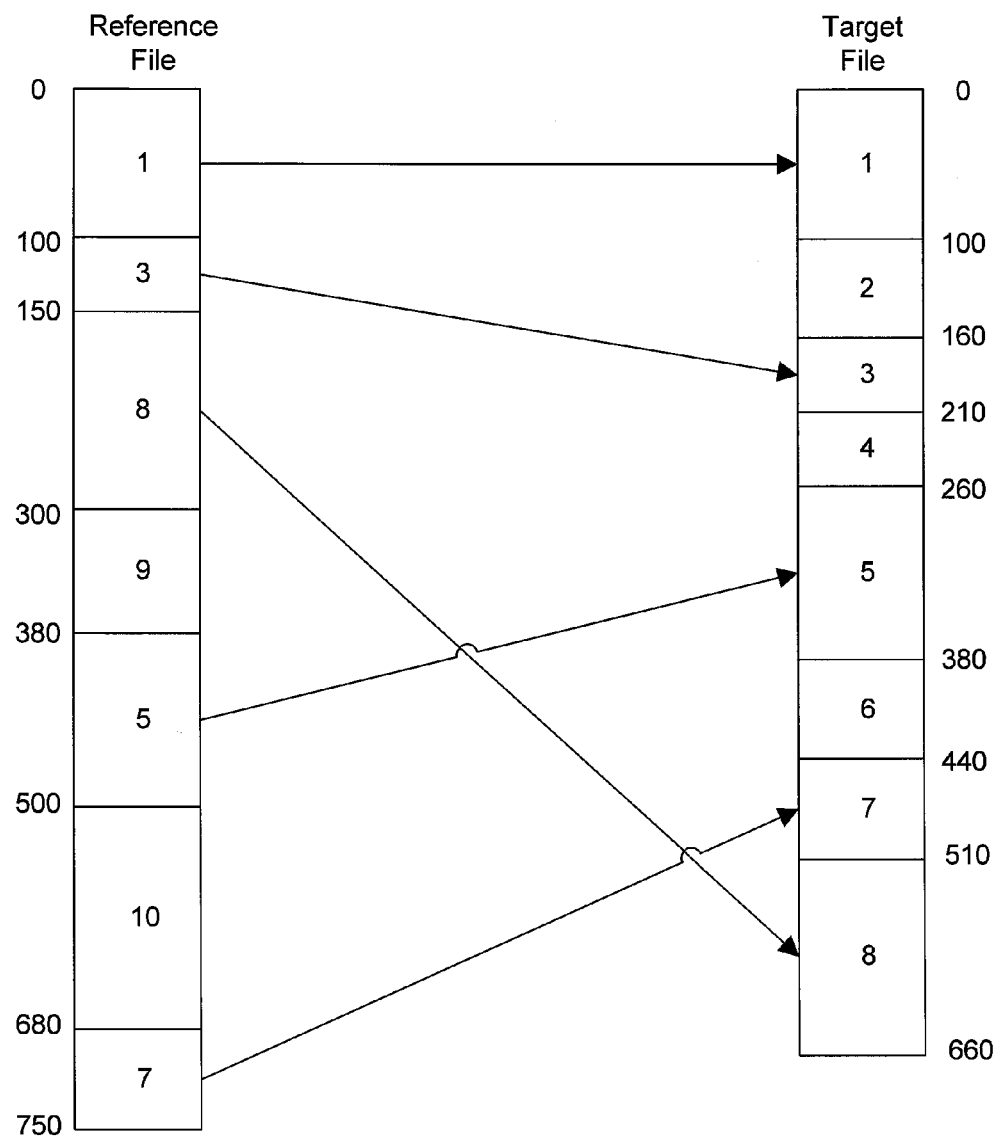
FIG. 2 is a schematic diagram showing example reference and target files and a copy/add based diff model.

FIG. 2 is a schematic diagram showing example reference and target files and a copy/add based diff model. A representation of a reference file is shown on the left, and a representation of a target file is shown on the right. Sections (or blocks) of the reference and target files that are the same are labeled with the same number.

In the illustrated example, assume the block sizes in the figure are as follows.

Block 1 has 100 bytes
Block 2 has 60 bytes
Block 3 has 50 bytes
Block 4 has 50 bytes
Block 5 has 120 bytes
Block 6 has 60 bytes
Block 7 has 70 bytes
Block 8 has 150 bytes
Block 9 has 80 bytes
Block 10 has 180 bytes This diff model defines difference data as a sequence of COPY/ADD string edit operations that reconstruct the target file from the reference file. After a sequence of COPY/ADD operations is identified (for example, in a diff or delta file), the sequence of operations should be encoded in an efficient manner: For example, the sequence of edit operations may be formed in the order of ascending addresses of target blocks for encoding efficiency. A copy operation may be encoded as <src_address, length>, where src_address is the offset distance of the copied block within the reference file, and the length is the block size. An ADD operation is encoded as <data, length>, where data is the data block being added to the target file, and the length is the block size. Using these definitions, the example shown in FIG. 2 has a difference that may be represented by the following sequence of eight edit (copy or add) operations:

1. COPY <0,100>
2. ADD <block 2,60>
3. COPY <100,50>
4. ADD <block 4,50>
5. COPY <380,120>
6. ADD <block 6,60>
7. COPY <680,70>
8. COPY <150,150>

While the above sequence uses the aforementioned definitions of the COPY and ADD functions, an alternate definition which provides additional clarity and detail is as follows. COPY<dest_address, src_address, length>, where dest_address is the offset of the copied block within the target file, src_address is the offset of the copied block within the reference file, and length is the length of the copied block. ADD <dest_address, data, length>, where dest_address is the offset of the copied block within the target file, data is the data block to be added to the target file, and length is the size of the block being added. Using these alternate definitions, the sequence of eight operations may be given as follows.

1. COPY <0,0,100>
2. ADD <100,block 2,60>
3. COPY <160,100,50>
4. ADD <210,block 4,50>
5. COPY <260,380,120>
6. ADD <380,block 6,60>
7. COPY <,440,680,70>
8. COPY <510,150,150>

A difference (diff or delta) file contains information or instructions on how to reconstruct the target file from the reference file. The diff file generated by a difference engine generally includes a sequence of edit operations, such as the COPY and ADD functions described above (or, alternatively, INSERT and DELETE string edit operations when used with a largest common subsequence technique). An efficient (i.e. good compression rate) diff engine generates a diff file with a greater number of COPY, rather than ADD, operations. In other words, under the COPY/ADD model, an efficient diff algorithm is good at identifying portions to copy from the reference to the target file. (Under the INSERT/DELETE model, an efficient diff algorithm is good at minimizing the portions inserted into the reference file.) In accordance with an embodiment of the invention, the difference engine uses the COPY/ADD model (i.e. generates difference data including COPY and ADD instructions).

The sequence of edit operations (the diff data) may be encoded by the difference engine into a single file. This file may be referred to as a diff file (or delta file) which provides the information needed by a merge engine to reconstruct the target file (using the reference file). There are many formats for encoding the sequence of edit operations.

Figure 3:
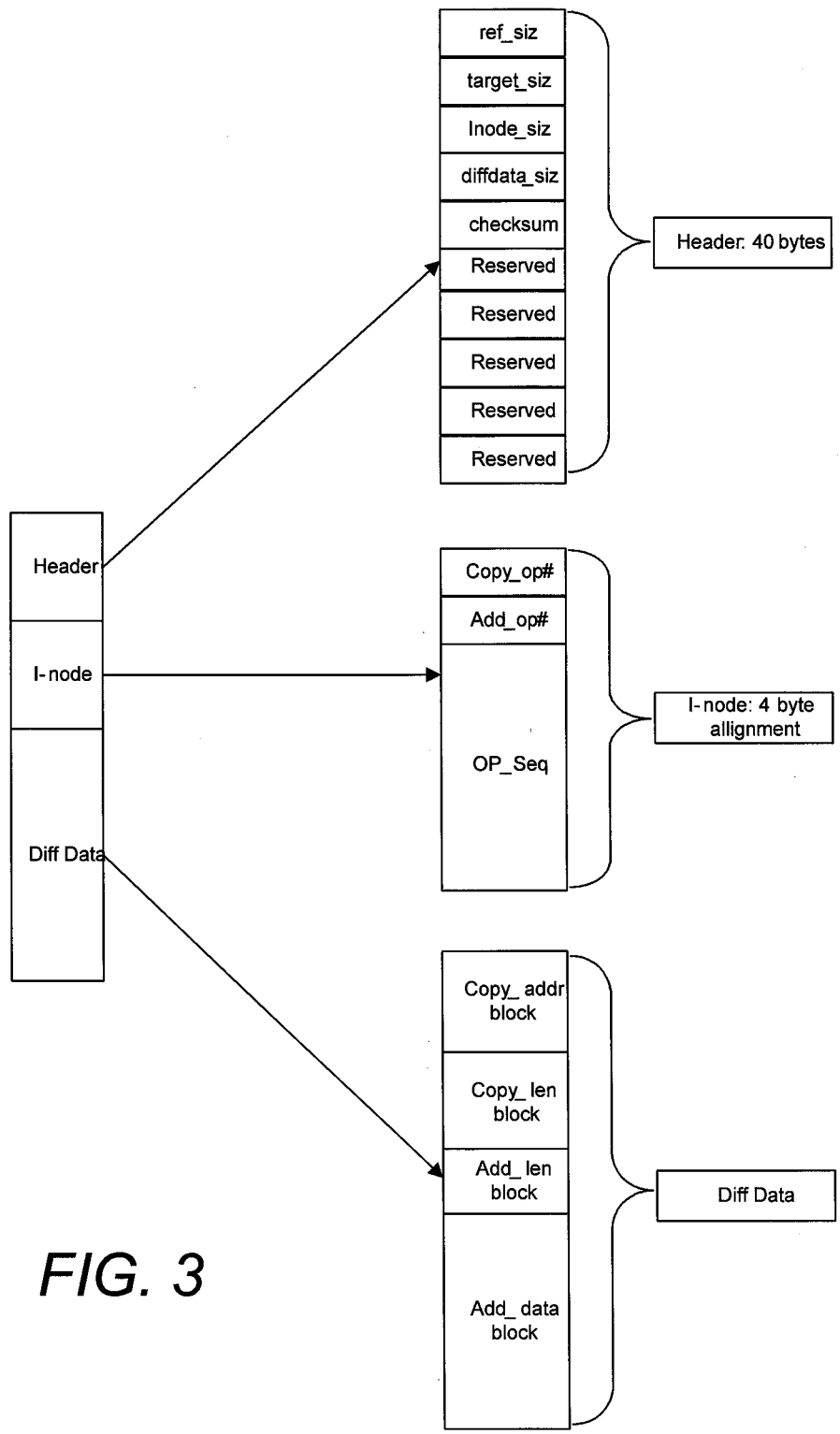
FIG. 3 is a schematic diagram showing an example structure for a difference file.

An example format of a diff (or delta) file is shown in FIG. 3 for illustrative purposes. The format is shown as having three sections: a Header, an I-node section, and a Diff Data section. In this example, the Header includes the metadata for the file. In this particular case, the header may be forty bytes in length, the reference file size (ref_siz), the target file size (target_siz), the I-node size (Inode_siz), the diff data size (diffdata_siz), the checksum (over the I-node and Diff Data), and the five Reserved data fields (for alignment) may each be four bytes in length. Other header formats may be used.

The I-node includes metadata for the edit operations and may be of varied size. A number of COPY operations (Copy_op#) and a number of ADD operations (Add_op#)

may be given in fields which are four bytes in length. The sequence of edit operations (Op_seq) indicates whether each operation in the sequence is a COPY or an ADD. For example, each operation may be represented by one bit, where the bit is one for COPY and zero for ADD.

The Diff Data gives the specific edit operation data and may also be of varied size. The sequence of COPY addresses may be given together, in order, as a single block of data (Copy_addr block), where each COPY address is four bytes in length. The sequence of COPY lengths may also be given together, in order, as a single block of data (Copy_len block), where each COPY length is four bytes long. Similarly, the sequence of ADD lengths may be given together, in order, as a single block of data (Add_len block), where each ADD length is four bytes long. Finally, the sequence of ADD data may be given together, in order, as a single block of data (Add_data block).

Figure 4:
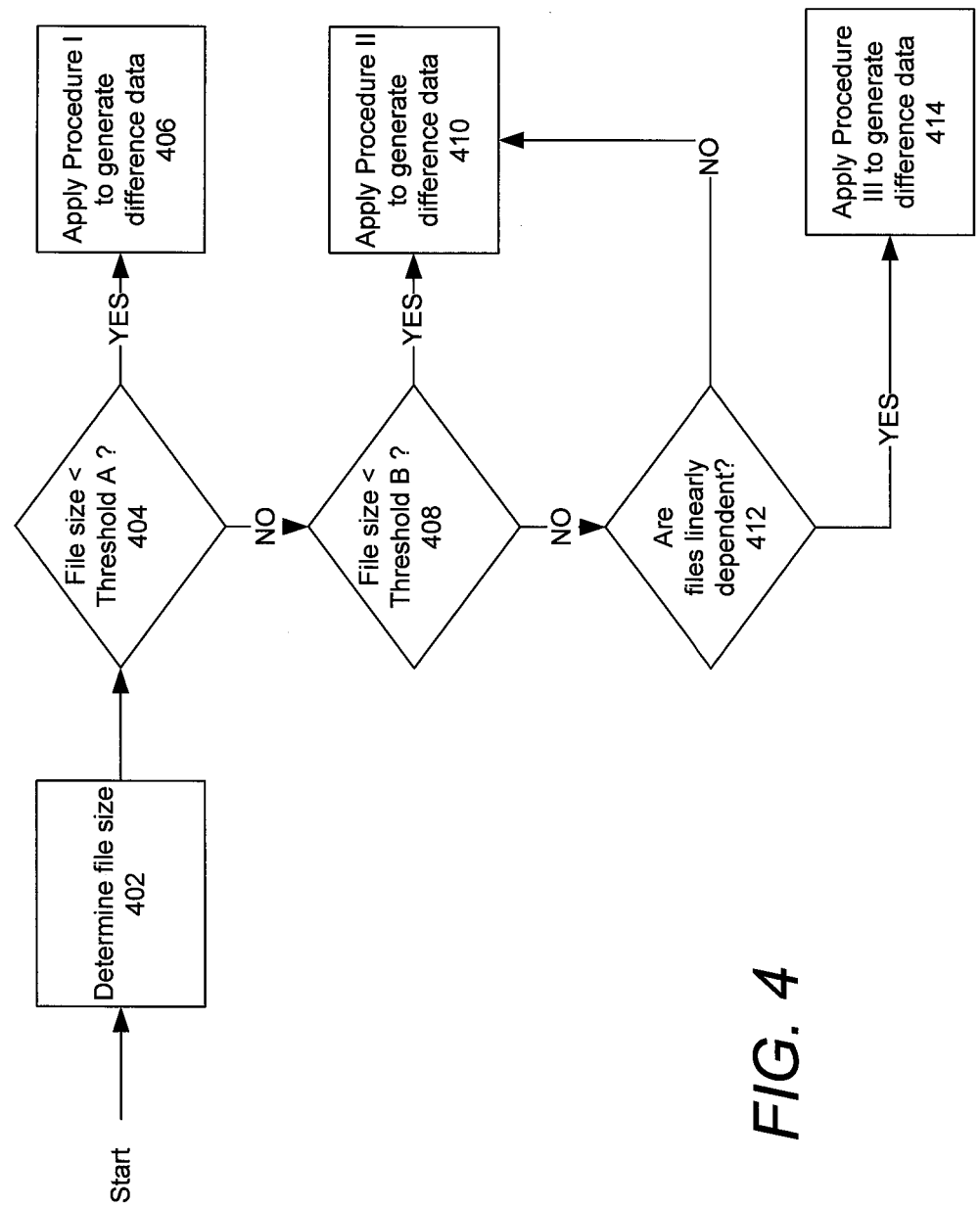
FIG. 4 is a flow chart showing a method of generating a difference file in accordance with an embodiment of the invention.

FIG. 4 is a flow chart showing a method of generating a difference file in accordance with an embodiment of the invention. As shown, a file size is determined 402. In particular, the size of the reference file is determined. This is because the size of a hash table needed depends on the size of the reference file under the Copy/Add model. This file size is used subsequently to determine which procedure to apply.

If the file size is determined 404 to be less than a first threshold size (Threshold A), then a first procedure (Procedure I) is applied 406 by the difference engine to generate the difference data between reference and target files. An exemplary first procedure is described below in reference to Table 1. For example, if Procedure I is implemented on a 32-bit computer with 512 MB memory, then Threshold A may be sixty-four megabytes (64 MB).

If the file size is determined 408 to be less than a second threshold size (Threshold B), then a second procedure (Procedure II) is applied 410 by the difference engine to generate the difference data between reference and target files. An exemplary second procedure is described below in reference to Table 2. For example, if Procedure II is implemented on a 32-bit computer with 512 MB memory, then Threshold B may be one gigabyte (1 GB). Otherwise, if the file size is determined 408 to be greater than the second threshold size (Threshold B), then a determination 412 may be made as to whether the reference and target files are linearly dependent.

If the files are determined 412 to be linearly dependent, then a third procedure (Procedure III) is applied 414 by the difference engine to generate the difference data between reference and target files. An exemplary third procedure is described below in reference to Table 3. Otherwise, if the files are determined 412 to not be linearly dependent, then Procedure II (or another alternate procedure) may be applied 410 (although that procedure may be relatively slow in generating the diff data).

First Procedure

Procedure I

In accordance with an embodiment of the invention, if the file size is less than a first threshold size (Threshold A), then a first procedure (Procedure I) is applied by the difference engine to generate the difference data between reference and target files. An exemplary first procedure is described below in reference to Table 1. The first procedure is advantageously configured to achieve a very good compression rate. However, this procedure requires relatively larger memory resources, so it is used for smaller file sizes.

TABLE 1

Input: Sliding hashing window size K; reference file R, reference file length Lr; target file T; and target file length Lt
Output: Compressed diff file
Procedure:
1. Create an empty chaining hash table H. The hash table size can be assigned as the smallest prime number larger than Lr
2. To generate hash records for the first (Lr − K + 1) sub-strings of length K of R based on Karp-Robin hash function:
   a. Calculate the hash value of the $1^{st}$ sub-string R[1,K] (For performance purpose, for example, Horner's rule may be used.)
   b. Slide the window to calculate all other hash values sequentially (To boost performance, for example, an iterative formula may be used.)
   c. Resolving hash collisions by chaining hash records
   d. Each hash record contains the offset of the hashed sub-string
3. Let p = 1
4. If p > Lt − K + 1, go to step 13
5. Calculate the hash value h from the sub-string T[p, p+K−1]
6. Look up the hash table record H[h].
7. If H[h] is empty, let p = p + 1, go to step 4
8. Let m = 0
9. Walk through all records in the chaining list of H[h] to compare T[p, p+K−1] with R[s, s+K−1] where s is the offset of the hashed sub-string of R:
   a. If T[p, p+K−1] = R[s, s+K−1], extend the common sub-string forward the longest one with length t. If t > m, let m = t and q = s.
   b. Get next record
10. If m = 0, let p = p + 1 and go to step 4
11. Get a COPY operation as COPY:<p,q,m> and append this operation to the COPY list (C-list).
12. Let p = p + m and go to step 4
13. Use the C-list, the target file length to create the ADD list (A-list) with destination addresses in ascending order. Also form the operation sequence S.
   a. Size of S = size of A-list + size of C-list
   b. S is something like {1, 0, 1, 0, 1, 0, 1, 1} for our example
14. Pack checksum, S, C-list and A-list into diff file.
15. Apply compression algorithm to compress the diff file The above procedure basically has three stages or groups of steps. A first stage of the procedure involves pre-processing the reference file to create a hash table. The first stage corresponds to steps 1 and 2. A second stage involves identifying copy operations with reasonably long sub-string matches based on a "greedy" strategy. The second stage includes steps 3 through 12. Lastly, a third stage packs and encodes the diff file. The third stage corresponds to steps 13 through 15.

Second Procedure

Procedure II

In accordance with an embodiment of the invention, if the file size is greater than the first threshold size (Threshold A) and less than a second threshold size (Threshold B), then a second procedure (Procedure II) is applied by the difference engine to generate the difference data between reference and target files. An exemplary second procedure is described below in reference to Table 2.

The second procedure is advantageously configured to achieve a reasonably good compression rate but generally not as good as the first procedure. Advantageously, the memory resources required by the second procedure is less than that required by the first procedure. This allows the second procedure to be used with larger (intermediate) size files.

TABLE 2

Input: Sliding hashing window size K; reference file R, reference file length Lr; target file T; and target file length Lt
Output: Compressed diff file
Procedure:
1. Create an empty chaining hash table H. The hash table size may be assigned as the smallest prime number larger than 2*Lr/B where B is the block size. The default block size B = 16.
2. Divide the whole reference file into N blocks with block size B (the last block size may be less than B).
3. For each block from the N blocks, one generates the hash value h from the $1^{st}$ sub-string of length K. If the h-th slot (corresponding to hash value h) of the hash table is empty, set this slot H[h] with the offset, otherwise, do the same for the next offset of the block until the empty slot of the hash table is found and set the empty slot with the offset. (This technique handles hash collisions in a different manner from the conventional xdelta algorithm.) If this block is exhausted without resolving the collision, nothing is done. In a preferred embodiment, a rolling hash function may be utilized to generate the hash values h. For example, the rolling hash function may be a Karp-Rabin rolling hash function.
4. Let p = 1
5. If p > Lt − K + 1, go to step 13
6. Calculate hash value of the sub-string h = T[p, p+K−1]
7. Look up the hash table record H[h].
8. If H[h] is empty, let p = p + 1 and go to step 5
9. If T[p, p+K−1] ≠ R[s, s+K−1] where s = H[h], let p = p + 1 and go to step 5
10. Extend the match of the common sub-strings T[p, p+K−1] and R[s, s+K−1] forward/backward as T[p−b, p+K+f−1] and R[s−b, s+K+f−1]. (Be cautious about the backward match that requires T[p−b, p+K+f−1] does not overlap the latest COPY block in C-list below.)
11. Get a COPY operation as COPY:<p−b, s−b, K+f+b > and append this operation to the COPY list (C-list).
12. Let p = p + f and go to step 5
13. Use the C-list, the target file length to create the ADD list (A-list) in ascending order of destination addresses. Also form the operation sequence S.
    a. Size of S = size of A-list + size of C-list
    b. S is something like {1,0,1,0,1,0,1,1} for our example
14. Pack checksum, S, C-list and A-list into diff file.
15. Apply compression algorithm to diff file The above procedure divides the reference files into blocks and generates a hash value for each block. One difference between the above procedure and the conventional xdelta algorithm is that the above procedure has an improved technique to handle hash collisions.

In accordance with an embodiment of the invention, the hash collisions may be handled as described above in step 3. In particular, hash collisions are not resolved by chaining nor resolved by hash slot overwriting. Instead of chaining, hash collisions are resolved by finding an empty hash slot. This avoids the need for each node of the hash table to have extra memory for pointers to support chaining. Rather, each node advantageously requires less memory because it only needs to store the offset, not any pointers. This capability allows us to process larger reference files. By not overwriting the hash slot with hash collisions, one increases the chances of more COPY operations. This enhancement over xdelta typically improves the compression rate. The improved compression rate is counter-intuitive because not using chaining means that the procedure may be less good at identifying portions of the reference file to copy to the target file. However, the savings in memory by not needing pointers at each node more than makes up for the slightly reduced effectiveness at identifying blocks to copy.

Another difference between the above procedure and the conventional xdelta algorithm is that the above procedure, in its preferred embodiment, utilizes a Karp-Rabin rolling hash function. In contrast, the xdelta algorithm uses an Adler-32 rolling hash function.

Third Procedure

Procedure III

In accordance with an embodiment of the invention, if the file size is greater than the second threshold size (Threshold B), then a third procedure (Procedure III) is applied by the difference engine to generate the difference data between reference and target files. An exemplary third procedure is described below in reference to Table 3. The third procedure is advantageously configured to handle very large file sizes despite limited memory resources.

TABLE 3

Summary and Analysis:
    Divide two linearly dependent files into two sequences of "trunks". These two sequences have the same number of trunks, say A[k] and B[k], k = 1,...,n.
    All trunk sizes are within a memory usage limit which may be configurable based on available system memory.
    Each B[j] is dependent on A[j] in terms of the diff copy operation --- there is a part (with minimum length) of B[j] that is a copy of partial A[j].
    If j ≠ k, then any part (with minimum length) of B[j] is not a copy of partial A[k].
    The minimum length avoids inefficient actions such as copying several bytes.
Procedure:
1. Identify the partitions to divide the reference and target files into "trunks" based on the nature of the specific file structure. The partition operation may be performed by a plug-in function in the diff engine.
2. Adaptively apply the first procedure (Procedure I) or the second procedure (Procedure II) to each pair of the trunks to get S, C-list and A-list for each trunk. For each trunk, the procedure selection (either the first or second procedure) is based according to the trunk size.
3. Merge all S, C-list and A-list of all trunks into one set of S, C-list and A-list accordingly.

In a first stage, the above procedure identifies partitions appropriate to the specific file structures of the reference and target files and uses those partitions to divide the reference and target files into "trunks". Preferably, each trunk is of a size less than Threshold B. In one implementation, the partition function may be implemented as a plug-in function for the diff engine. Such a plug-in function facilitates updating without need to change the core of the diff engine.

In a second stage, the above procedure adaptively applies either Procedure I or Procedure II to process each trunk so as to generate an operation sequence S, a copy list (C-list), and an add list (A-list). In particular, for each trunk, Procedure III applies either Procedure I or Procedure II depending on the size of that trunk. For example, if the trunk size is below Threshold A, then Procedure I may be applied to process the trunk. On the other hand, if the trunk size is above Threshold A, then Procedure II may be applied to process the trunk.

Finally, in a third stage, the operation sequences S are merged for all trunks, the copy lists (C-lists) are merged for all trunks, and the add lists (A-lists) are merged for all trunks. The result is diff data which includes the information needed to reconstruct the target file from the reference file.

Advantageously, diff data for very large files can be generated by Procedure III. This is despite finite limitations of available memory.

Procedure III is applicable to file sets which are linearly dependent. A diff engine without memory limitation generates a sequence of COPY instructions as {<destAddr[i], srcAddr[i], len[i]>} with the sequence {<destAddr[i]>} in ascending order. If the array {<srcAddr[i]>} is also in ascending order, then both the reference (src) and target (dest) files are linearly dependent. Now consider a file set {<F1, F2, ..., Fm>}. If all pairs of files from the set are linearly dependent, then the file set is said to be linearly dependent. (Note that the file set comprising the reference and target files depicted in FIG. 2 are not linearly dependent. This is because, in a sequence of COPY instructions for these files, if the destination addresses are in ascending order, the source addresses are not in ascending order.)

Linearly dependent file sets include the file sets in the following example use cases. In a first use case, if all files in a set are sequences of sorted data records with fixed record length, the set of files is a linearly dependent file set. In a second use case, document signature files used in data leakage prevention (DLP) systems may be linearly dependent. In a third use case, virus signature files used by anti-virus (AV) systems may be linearly dependent.

In accordance with an embodiment of the invention, the difference engine is configured to determine (or receive information on) whether or not the reference and target files are linearly dependent. For reference files larger than the second threshold size (Threshold B), if the reference and target files are linearly dependent, then the difference engine may apply Procedure III. Otherwise, if the target and reference files are not linearly dependent, then the difference engine may apply Procedure II, although that procedure would be slow (low performance) in generating the diff file.

Merging Procedure

An example merging procedure to reconstruct a target file using a reference file and a difference (or delta) file may be as disclosed below in Table 4.

TABLE 4

Input: Reference file R, reference file length, diff file, diff file size
Output: Target file T
Procedure:
 1. Read the diff file
 2. Decompress the diff file
 3. Validate the checksum and other necessary information
 4. Retrieve operation sequence S, C-list and A-list
 5. Using the order defined in S, C-list, and A-list and the reference file, reconstruct the target file piece-by-piece based on COPY and ADD operations.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. A computer-implemented method for generating difference data between reference and target files, the method being performed using a computer including at least a processor, data storage, and computer-readable instructions, and the method comprising:
   a difference engine implemented on the computer receiving the reference file and the target file;
   the difference engine determining a size of the reference file;
   the difference engine performing a first procedure to generate difference data representing the difference between the reference and target files if the size of the reference file is less than a first threshold size;
   the difference engine performing a second procedure to generate the difference data if the size of the reference file is less than a second threshold size and greater than the first threshold size; and
   the difference engine performing a third procedure to generate the difference data if the size of the reference file is greater than the second threshold size.

2. The method of claim 1, wherein the reference and target files form a file set which is linearly dependent.

3. The method of claim 2, wherein the reference and target files are sorted data records of fixed length.

4. The method of claim 2, wherein the reference and target files are document signature files.

5. The method of claim 2, wherein the reference and target files are computer virus signature files.

6. The method of claim 1, wherein the third procedure which is performed depends on whether or not the reference and target files are linearly dependent.

7. The method of claim 6, wherein the third procedure divides the reference file into a first sequence of trunks and divides the target file into a second sequence of trunks, wherein the first and second sequence have a same number of trunks, and a maximum size of the trunks is within a configurable memory usage limit.

8. The method of claim 7, further wherein there is a part, of at least a minimum length, in each trunk in the second sequence that is a copy of a part of a corresponding trunk in the first sequence.

9. The method of claim 8, wherein the third procedure determines a sequence of operations, a copy list, and an add list for each pair of trunks and merges all the sequences of operations, copy lists, and add lists to form a merged sequence of operations, a merged copy list, and a merged add list that comprise the difference data.

10. The method of claim 1, wherein the first procedure pre-processes the reference file to create a hash table using a sliding hash window.

11. The method of claim 1, wherein the second procedure pre-processes the reference file to create a hash table by dividing the reference file into blocks and generating a hash value for each block.

12. The method of claim 11, wherein a hash collision at a hash table node is handled by identifying an empty hash table node.

13. A computer apparatus configured to generate difference data between reference and target files, the apparatus comprising:

data storage configured to store computer-readable instruction code and data;

a processor configured to access the data storage and to execute said computer-readable instruction code;

a difference engine implemented on the computer apparatus and comprising computer-readable instruction code configured to determine a size of the reference file, perform a first procedure to generate difference data representing the difference between the reference and target files if the size of the reference file is less than a first threshold size, perform a second procedure to generate the difference data if the size of the reference file is less than a second threshold size and greater than the first threshold, and perform a third procedure to generate the difference data if the size of the reference file is greater than the second threshold size.

14. The apparatus of claim 13, wherein the reference and target files form a file set which is linearly dependent.

15. The apparatus of claim 14, wherein the reference and target files are sorted data records of fixed length.

16. The apparatus of claim 14, wherein the reference and target files are document signature files.

17. The apparatus of claim 14, wherein the reference and target files are computer virus signature files.

18. The apparatus of claim 13, wherein the third procedure which is performed depends on whether or not the reference and target files are linearly dependent.

19. The apparatus of claim 18, wherein the third procedure is configured to divide the reference file into a first sequence of trunks and the target file into a second sequence of trunks, wherein the first and second sequence have a same number of trunks, and a maximum size of the trunks is within a configurable memory usage limit.

20. The apparatus of claim 19, further wherein there is a part, of at least a minimum length, in each trunk in the second sequence that is a copy of a part of a corresponding trunk in the first sequence.

21. The apparatus of claim 20, wherein the third procedure is configured to generate a sequence of operations, a copy list, and an add list for each pair of trunks and to merge all the sequences of operations, copy lists, and add lists to form a merged sequence of operations, a merged copy list, and a merged add list that comprise the difference data.

22. The apparatus of claim 13, wherein the first procedure is configured to pre-process the reference file to create a hash table using a sliding hash window.

23. The apparatus of claim 13, wherein the second procedure is configured to pre-process the reference file to create a hash table by dividing the reference file into blocks and to generate a hash value for each block.

24. The apparatus of claim 23, wherein the second procedure is configured to handle a hash collision at a hash table node by identifying an empty hash table node.

* * * * *